United States Patent
Speight

(10) Patent No.: US 8,228,864 B2
(45) Date of Patent: *Jul. 24, 2012

(54) COMMUNICATION UNIT, SYSTEM AND METHOD FOR SAVING POWER THEREIN

(75) Inventor: Timothy J. Speight, Bristol (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/277,671

(22) Filed: Oct. 20, 2011

(65) Prior Publication Data

US 2012/0033596 A1  Feb. 9, 2012

Related U.S. Application Data

(63) Continuation of application No. 11/796,007, filed on Apr. 25, 2007, now Pat. No. 8,072,930.

(51) Int. Cl.
*H04W 4/00* (2009.01)
(52) U.S. Cl. .................................. 370/329; 370/328
(58) Field of Classification Search .................. None
See application file for complete search history.

(56) References Cited

U.S. PATENT DOCUMENTS

| | | | |
|---|---|---|---|
| 8,072,930 B2 * | 12/2011 | Speight | 370/329 |
| 2001/0031634 A1 | 10/2001 | Mizutani et al. | |
| 2003/0016633 A1 | 1/2003 | Enns et al. | |
| 2006/0029011 A1 | 2/2006 | Etemad et al. | |
| 2007/0189236 A1 | 8/2007 | Ranta-Aho et al. | |
| 2008/0261530 A1 | 10/2008 | Gerstenberger et al. | |

OTHER PUBLICATIONS

Holma, H. et al. eds. (2001) *WCDMA for UMTS: Radio Access for Third Generation Mobile Communications*, John Wiley & England, 10 pages (Table of Contents).

* cited by examiner

*Primary Examiner* — Erika Gary
(74) *Attorney, Agent, or Firm* — Oblon, Spivak, McClelland, Maier & Neustadt, L.L.P.

(57) ABSTRACT

A communication unit comprises a receiver for receiving a message sent on an allocation channel, packet identifying logic, capable of identifying a data type of the received message, operably coupled to buffer logic for buffering data packets to be sent to the second communication unit. In an active mode of operation, the receiver of the communication unit is capable of intermittently receiving the message sent on the allocation channel and transition to continuously receive the message sent on the allocation channel in response to either: the buffer logic identifying that data packets are to be transferred to the second communication unit; or the packet identifying logic receiving a communication resource allocation message and identifying resource allocation data therein.

15 Claims, 6 Drawing Sheets

COMMUNICATION UNIT, SYSTEM AND METHOD FOR SAVING POWER THEREIN

CROSS-REFERENCE TO RELATED APPLICATIONS

This application is a continuation of and is based upon and claims the benefit of priority under 35 U.S.C. §120 for U.S. Ser. No. 11/796,007, filed Apr. 25, 2007 (now U.S. Pat. No. 8,072,930), the entire contents of which is incorporated herein by reference.

FIELD OF THE INVENTION

The field of the invention generally relates to utilization of communication resources in cellular communication systems. In particular, but not exclusively, the invention relates to an apparatus and method for power saving in packet switch cellular communication systems.

BACKGROUND OF THE INVENTION

Currently, 3rd generation cellular communication systems are being rolled out to further enhance the communication services provided to mobile phone users. The most widely adopted 3rd generation communication systems are based on Code Division Multiple Access (CDMA) and Frequency Division Duplex (FDD) or Time Division Duplex (TDD) technology.

TDD provides for the same carrier frequency to be used for both uplink transmissions, i.e. transmissions from the mobile wireless communication unit (often referred to as wireless subscriber communication unit) to the communication infrastructure via a wireless serving base station as well as downlink transmissions, i.e. transmissions from the communication infrastructure to the mobile wireless communication unit via a serving base station. In TDD, the carrier frequency is subdivided in the time domain into a series of timeslots. The single carrier frequency is assigned to uplink transmissions during some timeslots and to downlink transmissions during other timeslots. An example of a communication system using this principle is the Universal Mobile Telecommunication System (UMTS). Further description of CDMA, and specifically of the Wideband CDMA (WCDMA) mode of UMTS, can be found in 'WCDMA for UMTS', Harri Holma (editor), Antti Toskala (Editor), Wiley & Sons, 2001, ISBN 0471486876.

In order to provide enhanced communication services, the 3rd generation cellular communication systems are designed to support a variety of different and enhanced services. One such enhanced service is multimedia services. The demand for multimedia services that can be received via mobile phones and other handheld devices is set to grow rapidly over the next few years. Multimedia services, due to the nature of the data content that is to be communicated, require a high bandwidth. Hence, packet-switched based data provision is generally adopted.

Typically, subscriber units (referred to as User Equipment (UE) in 3GPP parlance) that are operationally inactive are placed in a 'paging' state. In this 'paging' state UEs very occasionally listen (possibly less frequently than 500 msec's) to a dedicated paging channel, which carries messages that indicate whether there is downlink (DL) data for the UE. If the message indicates that DL data exists for the UE, the UE knows that it should transition into an operational state, such as a 'data traffic' state, where it can send and receive data traffic. If there is UL traffic to be sent to the network, then the UE transitions straight away into the appropriate state to send data traffic. However, it is known that this state transition can take a substantial period of time (typically the state transition can be in the order of 100 msec).

The paging channel is deliberately designed so that the UE only has to 'infrequently' access it to receive messages, in order to minimise the power requirements of the UE. However, in accessing the paging channel infrequently, thereby saving power, there is a consequent increase in latency in subsequently transmitting or receiving data. In a packet switched based cellular communication system this latency may be severely detrimental to the overall performance of the system.

Once the UE has been successfully paged, and is in the 'data traffic' state, the UEs listens, in every frame, to an allocation channel that allocates resources on a separate shared channel for a limited period of time.

The allocation of shared resources may be performed either in response to the UE signaling to the network that it has uplink (UL) buffer occupancy, i.e. the UE has buffered data that it needs to transmit to the network on an uplink channel, or through provision of internal reporting within the network in the case of downlink (DL) data. Supporting UE signaling and/or internal reporting of DL data adds further complexity to the system.

It would of course be possible to keep as many users in the 'data traffic state' as possible even though they had not sent or received data for a long period of time. This would minimise latency. However, it would be detrimental to power requirements at the UE because it would have to listen to the allocation channel in every frame.

It is shown, therefore, that there is trade-off between minimizing UE power requirements and latency performance.

Subsequently, in the 'data traffic' state, all UEs listen, in every frame, to an allocation channel that allocates shared resources for a limited period of time. Thus, the requirement for all UEs to listen in every frame to an allocation channel, before transitioning to an allocated channel from a plurality of shared resources, as instructed by the network, also increases the latency.

Consequently, current techniques are suboptimal. Hence, an improved mechanism to address the latency versus power saving problem of in packet switched cellular communication systems is desired.

SUMMARY OF THE INVENTION

Accordingly, embodiments of invention seek to mitigate, alleviate, or eliminate one or more of the abovementioned disadvantages, singly or in any combination.

According to some embodiments of the invention, a communication unit is provided comprising a receiver for receiving a message sent on an allocation channel, packet identifying logic capable of identifying a data type of the received message operably coupled to buffer logic for buffering data packets to be sent to the second communication unit. In an active mode of operation, the receiver is capable of intermittently receiving the allocation channel (to see if there is a message on the allocation channel allocating shared channel to the UE) and transition to continuously receive the allocation channel in response to at least one of: the buffer logic identifying that data packets are to be transferred to the second communication unit; or the packet identifying logic receiving a communication resource allocation message and identifying resource allocation data therein.

According to an optional feature of the invention, the communication unit is configured to operate in a third Generation Partnership Project (3GPP) cellular communication system. Thus, the inventive concept may be applied to UE states where the UE sends and receives data on shared channels.

According to some embodiments of the invention, the packet identifying logic may identify whether only a 'keep alive' message is contained in the message sent on the shared channel. In this regard, upon determining a message other than a 'keep alive' message, the communication unit may transition to continuously receive messages that allocate shared channel resources sent on the allocation channel. This optional feature enables the communication unit to remain in an inactive sub-state and only intermittently listen to the allocation channel whilst receiving 'keep alive' messages.

In some embodiments of the invention, the keep alive message may be a link control protocol (LCP) echo/response message when the communication unit is in the inactive state.

In some embodiments of the invention, the communication unit is a wireless subscriber communication unit and the second communication unit is a network-based communication unit. The wireless subscriber communication unit may comprise buffer determining logic operably coupled to the buffer logic operable for at least one uplink radio link control (RLC) buffer(s) and capable of identifying buffer occupancy in the at least one uplink RLC buffer(s).

In some embodiments of the invention, the communication unit is a network-based communication unit and the second communication unit is a wireless subscriber communication unit. The network-based communication unit may comprise buffer determining logic operably coupled to the buffer logic configured as at least one uplink radio link control (RLC) buffer(s) and capable of identifying buffer occupancy in at least one of: at least one uplink radio link control (RLC) buffer(s); at least one downlink RLC buffer(s).

Embodiments of the invention may allow power saving within the communication unit, compared to conventional data traffic state operation, by facilitating an intermittent and more intelligent listening operation of the allocation channel. In this manner, a significant conservation in the battery life of the wireless subscriber communication unit may be achieved.

Embodiments of the invention may improve latency compared to conventional systems where UEs are placed in a paging state.

Further, some embodiments of the invention may improve the power usage for UEs that are forced to remain in a 'data active' state. In this regard, some embodiments of the invention may provide an optimal compromise between these two strategies. Within some embodiments of the invention it may be possible to vary the frequency that UEs listen to the allocation channel, and thus provide a gradual transition between good latency performance (where the UE reads the allocation frequently) and improved power saving at the UE (where the UE reads allocation less frequently).

According to some embodiments of the invention, there is provided a method of saving power in a cellular communication unit comprising: receiving a message sent on an allocation channel of a cellular communication system; identifying a data type of the received message sent between the cellular communication unit and a second communication unit; and buffering data packets to be sent to the second communication unit. The method further comprises: intermittently receiving the message sent on the allocation channel; and transitioning to continuously receive the message sent on the allocation channel in response to either: identifying that data packets are to be transferred to the second communication unit; or receiving a communication resource allocation message and identifying resource allocation data therein.

According to other embodiments of the invention, there is provided a communication unit capable of transferring data packets with a second communication unit. The communication unit comprises a memory; a processor coupled to the memory; and program code executable on the processor, the program code operable for performing the aforementioned method.

According to embodiments of the invention, there is provided a computer program product comprising program code for supporting communication between a communication unit and a second communication unit. The computer program product comprises program code for performing the aforementioned method.

According to some embodiments of the invention, there is provided a communication unit comprising logic for receiving a message sent on an allocation channel of a cellular communication system; logic for identifying a data type of the received message sent between the communication unit and a second communication unit; and logic for buffering data packets to be sent to the second communication unit. The communication unit further comprises logic for intermittently receiving the message sent on the allocation channel; and logic for transitioning to continuously receive the message sent on the allocation channel in response to at least one of: logic for identifying that data packets are to be transferred to the second communication unit; logic for receiving a communication resource allocation message and identifying resource allocation data therein.

According to some embodiments of the invention, there is provided a cellular communication system supporting communication between a communication unit and a second communication unit. The communication unit comprises a receiver capable of receiving a message sent on an allocation channel of the cellular communication system, packet identifying logic capable of identifying a data type of the received message operably coupled to buffer logic for buffering data packets to be sent to the second communication unit. In an active mode of operation, the receiver of the communication unit is capable of intermittently receiving the message sent on the allocation channel and the communication unit is capable of transitioning to continuously receive the message sent on the allocation channel in response to at least one of: the buffer logic identifying that data packets are to be transferred to the second communication unit; the packet identifying logic receiving a communication resource allocation message and identifying resource allocation data therein.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which.

Figure 1:
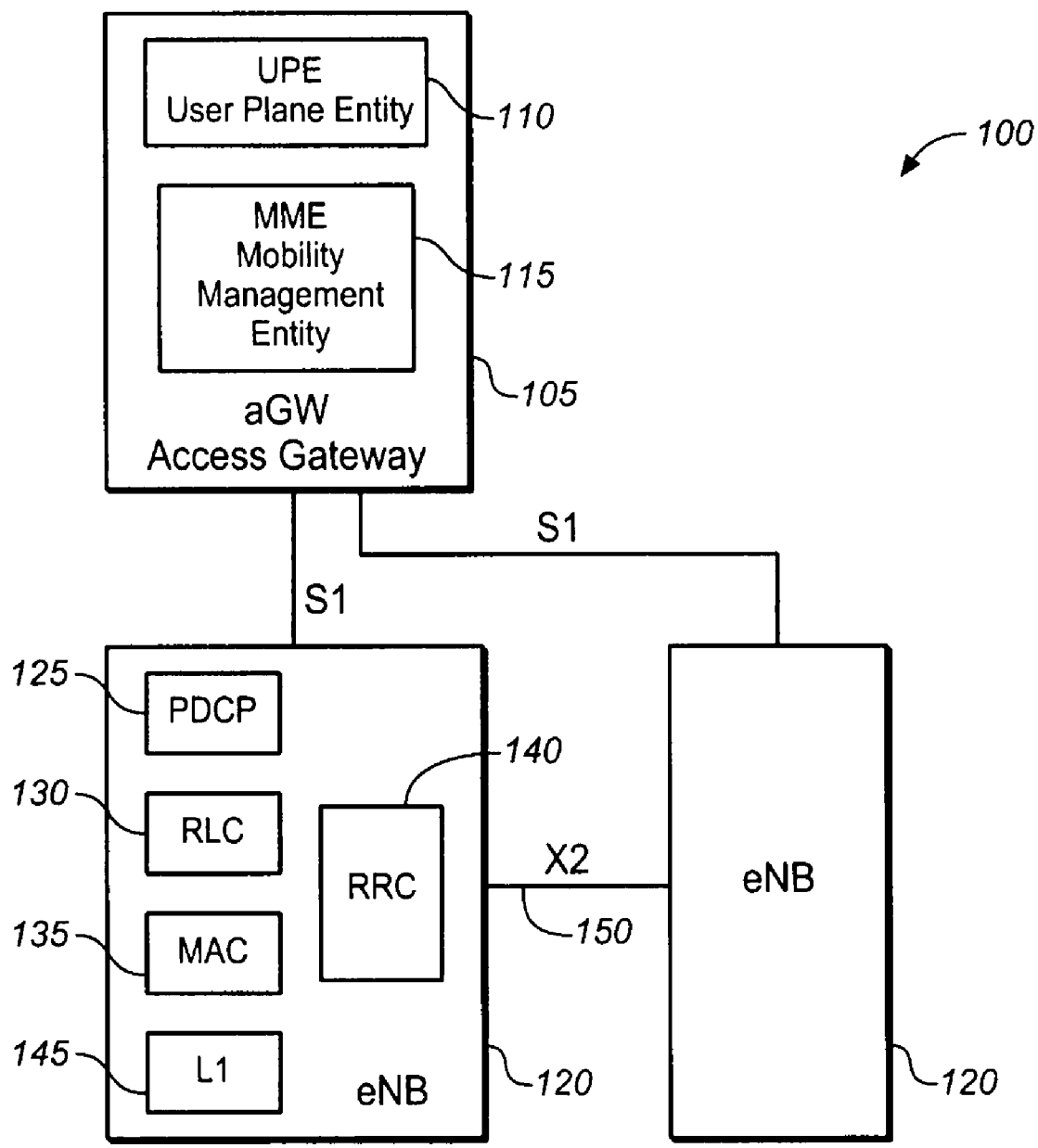
FIG. 1 illustrates a communication protocol representation of a cellular communication system adapted in accordance with some embodiments of the present invention.

DETAILED DESCRIPTION OF EMBODIMENTS
OF THE INVENTION

The following description focuses on embodiments of the invention applicable to a UMTS. (Universal Mobile Telecommunication System) cellular communication system and in particular to a UMTS Terrestrial Radio Access Network (UTRAN) within a 3rd generation partnership project (3GPP) system. However, it will be appreciated that the invention is not limited to this particular cellular communication system, but may be applied to other packet switched communication systems.

In embodiments of the invention, a cell_FACH (Forward Access CHannel) state in a 3GPP communication system is adapted to support efficient power saving, although the inventive concept may be applied to any communication system employing shared channels. Cell_FACH state is a state in the current 3GPP standard that may employ a shared channel only operation. For example, an embodiment of the invention may be applied to the long-term evolution (LTE) standard within 3GPP, where the UE employs shared channels as it is not allocated dedicated resources.

In some embodiments of the invention, when the UE is configured to only infrequently read the allocation channel (for example it is configured to be in an 'inactive sub-state') the UE is able to reduce its power requirements by switching off layer-1 and transport channel processing functionality during times where the UE knows there is no allocation for it. The layer-1 functionality may also include automatic gain control (AGC), automatic frequency control (AFC) and frame tracking.

Conventionally, a UE transitions into the data traffic state, in response to the UE signaling to the network indicating it has UL buffer occupancy, or by provision of internal reports in the network in the case of DL data. In contrast to the conventional mechanism, where a UE then listens in every frame to an allocation channel that allocates shared resources for a limited period of time, embodiments of the invention propose a scheme whereby UEs only occasionally listen to the allocation channel while remaining in the data traffic state. Thus, embodiments of the invention provide a 'sub-state' within the data traffic state, hereafter termed an 'inactive sub-state'.

In an enhanced embodiment of the invention, logic is provided to ensure that if only higher layer 'keep alive' messages (e.g. LCP echo/response messages) are sent between the radio network controller (RNC) in the UTRAN and the UE, then the UE remains in the 'inactive' state.

The 'keep-alive' type messages occur in data networks and are associated with protocols that are not directly accessible to users. These messages are small messages that occur even when there is no data being presented to the user. They are typically used for establishing, configuring or testing the data link connection.

Within 3GPP, point-to-point protocol (PPP) provides a method for encapsulating and transporting many different protocol datagrams over point-to-point links. It includes a link control protocol (LCP) to manage the link. Within the LCP protocol there exists an 'echo-request' and 'echo-response' message. In many applications the echo request/response message is used periodically to confirm that a client is still connected (hence the term 'keep alive') and/or determine round trip times.

Other management protocols such as Internet control message protocol (ICMP), which can use IP directly rather than using PPP, have similar 'ping' functions. These may also be termed 'keep alive' messages in the context of embodiments of the invention.

Referring now to FIG. 1, a communication protocol representation of a cellular-based communication system 100 is shown in outline, in accordance with embodiments of the invention. In these embodiments, the cellular-based communication system 100 is compliant with, and contains network elements for operating over, a universal mobile telecommunication system (UMTS) air-interface. In particular, the embodiments relate to the Third Generation Partnership Project (3GPP) specification for wide-band code-division multiple access (WCDMA), time-division code-division multiple access (TD-CDMA) and time-division synchronous code-division multiple access (TD-SCDMA) standard relating to the UTRAN radio Interface (described in the 3GPP TS 25.xxx series of specifications).

In particular, the communication protocol representation 100 of the 3GPP system is adapted to support future evolutions of UTRA 3GPP (currently referred to as 'long term evolution' (LTE)). The communication protocol representation 100 comprises enhanced Node-Bs (eNBs) 120 communicating via an access gateway 105 to other communication entities (not shown) within the communication system.

The access gateway 105 comprises a user plane entity (UPE) 110 operably coupled to a mobility management entity (MME) 115. The RNC functionality in LTE resides entirely in the eNode-B. In the access gateway the mobility management entity (MME) functionality is mobility functionality for paging/idle mode mobility, and the UPE provides user plane functionality.

As mentioned above, the access gateway 105 is operably coupled to eNBs 120, which comprise logic to facilitate communication between the following protocol layers: PDCP 125, radio link control (RLC) layer 130, medium access control (135) layer and the physical (layer-1) layer 145, the communication between these layers being controlled by radio resource control logic 140.

In accordance with embodiments of the invention, the PDCP layer 125 may be modified to be able to identify 'keep alive' type messages. New signaling is also provided between the PDCP entity and the radio resource control (RRC) entity 140, so that the RRC entity 140 can be informed whether data that is, or is not, a keep alive has been detected. The RRC entity 140 may also modified so that it is able to store a record of those UEs that are in an 'inactive' or an 'active' sub-state. In this manner, the RRC entity 140 is able to ensure that when messages are sent on the allocation channel (allocating shared channel resources) they are sent in an appropriate frame so that a particular UE in the 'inactive' sub-state is reading the allocation channel in this frame.

In accordance with embodiments of the invention, the radio resource control (RRC) logic 140 within a network element, such as an enhanced Node-B 120 (or other element such as the radio network control (RNC) element), is adapted to identify a data packet type. For example, in a 3GPP context, this may be achieved by identifying a LCP echo/response message at the packet data control protocol (PDCP) layer 125.

Figure 2:
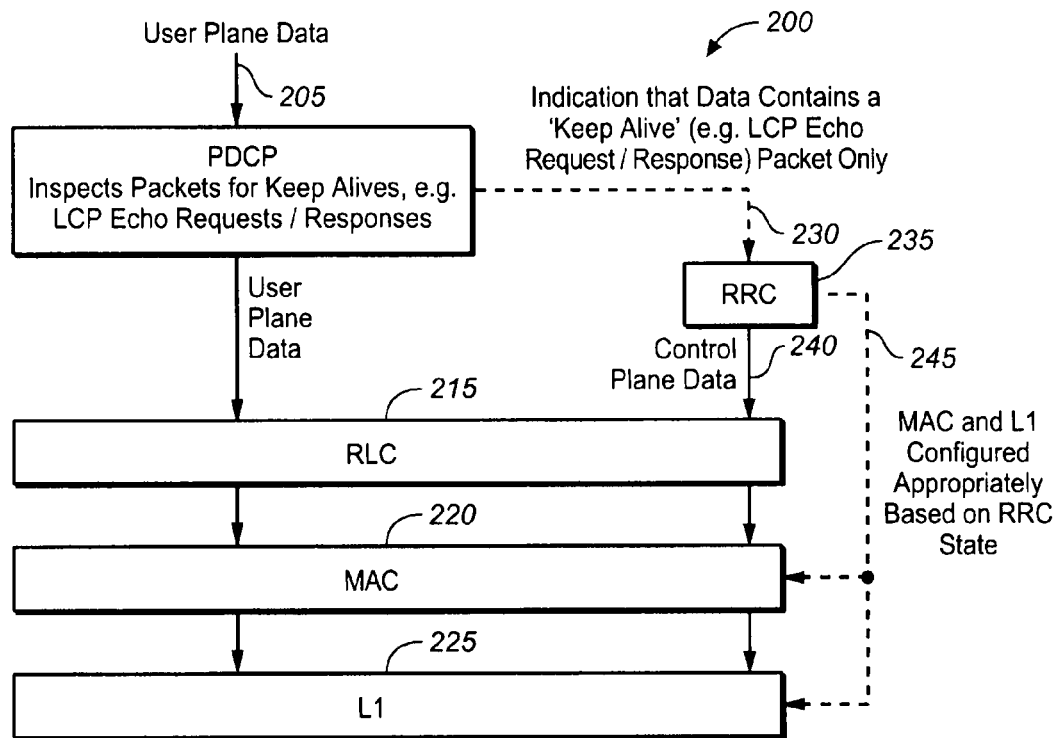
FIG. 2 illustrates a protocol-based architecture of a UE sub-state determination process in a data traffic state in accordance with some embodiments of the invention.

Referring now to FIG. 2, a protocol-based architecture 200 of how to determine a UE sub-state in a data traffic state, which applies equally to a network and a UE, is illustrated, in accordance with some embodiments of the invention. In the protocol-based architecture 200, user plane data 205 is passed to adapted PDCP logic 210, which inspects the received user plane data packets for 'keep alive' messages. If the adapted PDCP logic 210 determines that no 'keep alive' messages in the user plane data 205 were received, then the user plane data 205 is passed through the various layers of the OSI protocol, as in the known prior art, namely the radio link control layer (RLC) 215, the medium access layer (MAC) 220 and layer-1 physical layer 225.

As will be appreciated by one skilled in the art, for UL data the RRC will receive a request for allocation firstly (when considering the protocol-based architecture 200 applies to a network side case), and then the RRC will allocate shared resources (ensuring that if the UE is in the 'inactive sub-state' the appropriate frame is used). The data will then arrive at the layer-1 physical layer 225, passing through, the MAC layer 220 and the RLC layer 215. Only then will the PDCP logic 210 (layer) be able to determine if the data is or is not a 'keep alive'.

However, in accordance with embodiments of the invention, if the adapted PDCP logic 210 determines that 'keep alive' messages in the user plane data 205 were received, then an indication 230 of this fact is sent to RRC logic 235. In response to this indication, the RRC logic 235 configures, using one or more control signal(s) 245, the MAC layer logic 220 and the layer-1 logic 225 according to the RRC state. The one or more control signals ensure that, at the UE side, then the Layer-1 functionality can be switched off during times when the UE does not have to listen to the allocation channel. Also, if HSDPA or enhanced uplink signaling channel (E-USCH) or LTE is employed, then the MAC layer logic 220 is informed when it must read the allocation channel.

At the UTRAN side, if HSDPA/E-USCH in 3GPP or LTE is employed, then the MAC layer logic 220 needs to be informed that the UE is in the inactive substate, so that it can ensure that allocation messages are only sent to the UE during frames that it is actually listening to.

The control plane data 240 is then output from the RRC logic 235 through the OSI protocol layers: radio link control layer (RLC) 215, re-configured medium access layer (MAC) 220 and re-configured layer-1 physical layer 225.

In alternative embodiments of the invention, the adaptation of the MAC layer 220 and/or layer-1 logic 225 may be performed directly in response to packet identifying logic contained within the network, in contrast to adaptation controlled by the RRC logic. This is the case where LTE or HSDPA/E_USCH is employed, where the RRC really does not need to know the state because it no longer controls the allocation of shared resources.

One skilled in the art will appreciate that the above logic and corresponding operational steps has mirrored logic and functionality in the network, and is shown with respect to the UE for clarity purposes. In this manner, the UE and network are synchronized in determining the sub-state, for example by employing the exemplary flowcharts shown, as this will ensure that both the UE and the network are synchronised implicitly (without signaling).

However, in an alternative embodiment of the invention, in some instances it may be acceptable for the UE to declare itself in the 'active sub-state', while the network still believes the UE to be inactive. This scenario enables the UE to listen to the allocation channel all the time, but where the network will only send an allocation message infrequently. This results in extra latency, but at least allocation messages are not missed.

Figure 3:
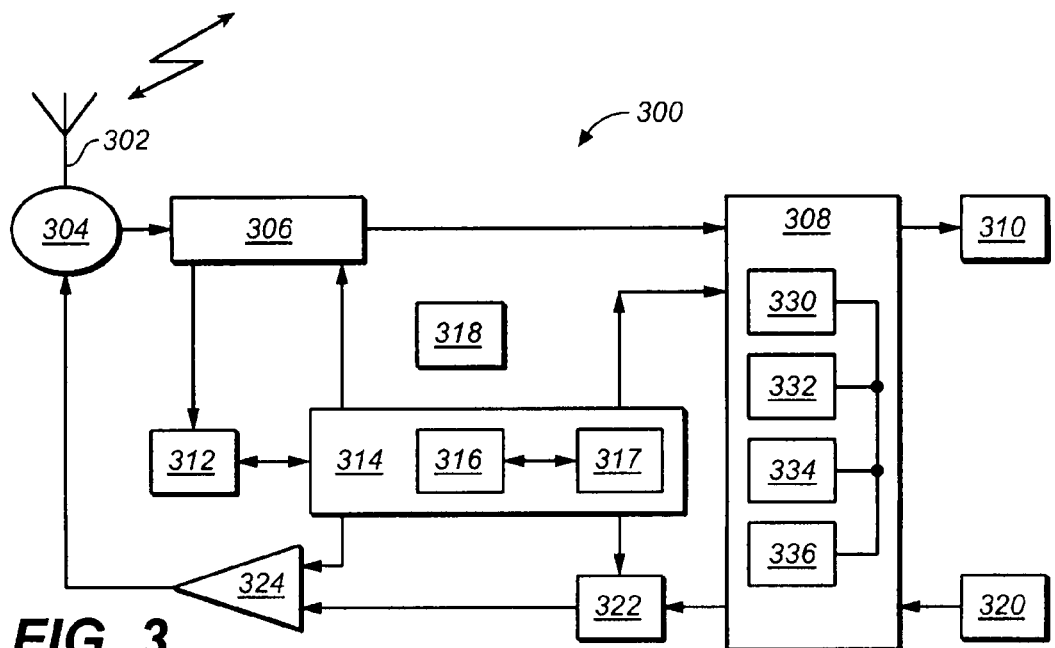
FIG. 3 illustrates a simplified block diagram of a user equipment (UE) adapted in accordance with some embodiments of the invention.

Referring now to FIG. 3, a block diagram of a wireless subscriber communication unit (UE in the context of a 3GPP cellular communication system) is shown, adapted in accordance with some embodiments of the invention.

The UE 300 contains an antenna 302 coupled to antenna switch 304 that provides isolation between receive and transmit chains within the UE 300.

The receiver, chain, as known in the art, includes receiver front-end circuitry 306 (effectively providing reception, filtering and intermediate or base-band frequency conversion). The front-end circuitry 306 is serially coupled to a signal processing function 308. An output from the signal processing function 308 is provided to a suitable output device 310. A controller 314 maintains overall subscriber unit control. The controller 314 is also coupled to the receiver front-end circuitry 306 and the signal processing function 308 (generally realised by a digital signal processor (DSP)). The controller is also coupled to a memory device 316 that selectively stores operating regimes, such as decoding/encoding functions, synchronisation patterns, code sequences, direction of arrival of a received signal and the like.

In accordance with embodiments of the invention, the timer 318 comprises a 'data traffic state inactive' timer and is operably coupled to the controller 314 to control the timing of operations (transmission or reception of time-dependent signals) within the UE 300.

As regards the transmit chain, this essentially includes an input device 320, such as a keypad, coupled in series through transmitter/modulation circuitry 322 and a power amplifier 324 to the antenna 302. The transmitter/modulation circuitry 322 and the power amplifier 324 are operationally responsive to the controller 314.

The signal processor function 308 in the transmit chain may be implemented as distinct from the processor in the receive chain. Alternatively, a single processor 308 may be used to implement processing of both transmit and receive signals, as shown in FIG. 3. Clearly, the various components within the UE 300 can be realized in discrete or integrated component form, with an ultimate structure therefore being an application-specific or design selection.

In accordance with some embodiments of the invention, the signal processor 308 has been adapted to comprise buffer determining logic 330 operable to identify when the UE 300 has zero buffer occupancy in UL RLC buffers 332. In response to the UE 300 receiving no allocation messages that contain DL resources, the signal processor 308 initiates the 'data traffic state inactive' timer 317. The initial timer value is signalled to the UE. If the 'data traffic state inactive' timer 317 expires, then the UE will be in a data traffic inactive substate.

In the inactive substate, if at anytime the UE receives an allocation message, then it will read the allocation channel in every frame until an update from the packet identifying logic 334 is received.

If the update from the packet identifying logic 334 indicates that the UE 300 should remain in the inactive substate (for example when only 'keep alive' packets are detected) then radio resource control (RRC) logic 336 will return fully to inactive. substate and read the allocation channel infrequently as defined in the following section.

If the update from the packet identifying logic 334 indicates that the UE 300 should transition to the active state (for example when data packets other than 'keep alive' data packets are detected) then the UE 300 will fully enter the active state and read the allocation channel in every frame.

It should be noted that when in the inactive substate, the UE 300 will continue to act on all allocation messages as normal.

Figure 4:
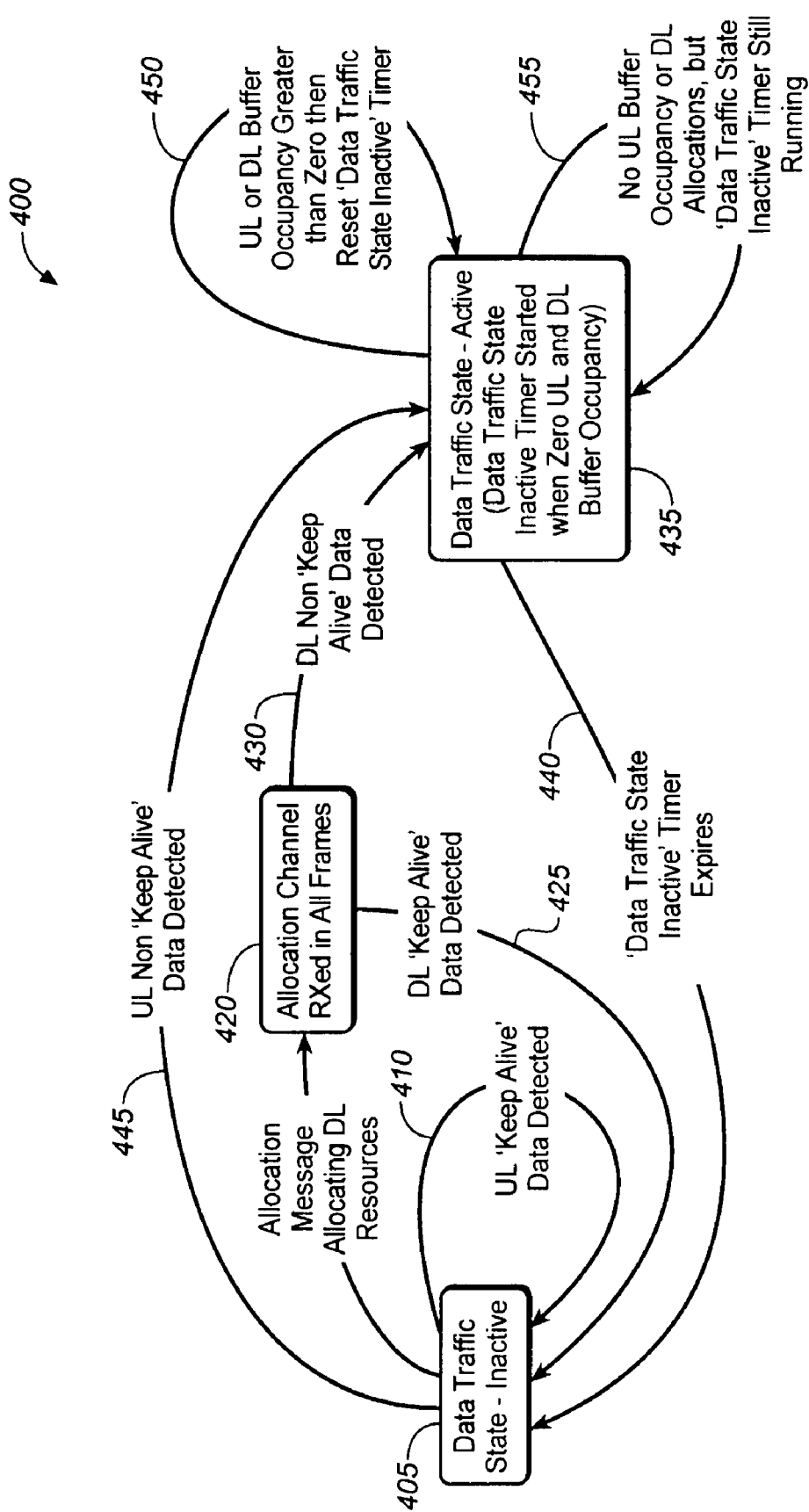
FIG. 4 illustrates a UE state diagram in accordance with some embodiments of the invention.

Referring now to FIG. 4, a UE state diagram 400 is illustrated in accordance with some embodiments of the invention. The UE state diagram 400 commences in step 405 with the UE in a data traffic 'inactive' substate. The UE remains in the data traffic 'inactive' substate 405 while UL 'keep alive' data is detected in step 410. If UL non 'keep alive' data is detected, in step 445, the data traffic state becomes active and a data traffic state inactive timer is initiated, in step 435.

In accordance with some embodiments of the invention, the data traffic state inactive timer measures the time since real (for example, non-'keep alive') data has been transferred to/from the UE. Whenever real (for example, non-'keep alive') data is detected, it is reset. In some embodiments of the invention, the data traffic state inactive timer may have a preconfigured timeout value (signalled to the UE). The UE returns to the inactive state when the timeout value is reached.

In the inactive substate, if at any time the UE receives an allocation message allocating DL resources, then the UE re-configures itself to read the allocation channel in every frame, as shown in step 420, while DL 'keep alive' data is detected in step 425. As soon as DL 'non-keep alive' data is detected, in step 430, the data traffic state transitions from an inactive substate to an active state.

A data traffic state inactive timer is initiated when there is zero UL buffer occupancy and the UE receives no allocation message that allocates DL shared channel resources, in step 435. Upon determining that the UL buffer occupancy is greater than zero, or allocation messages that allocate DL shared channel resources have been received, the data traffic state inactive timer is reset in step 450.

If there is no UL buffer occupancy or DL allocations the data traffic state inactive timer is configured to continue running, in step 455. If the data traffic state inactive timer expires, in step 440, the data traffic state resumes as being inactive, in step 405.

Since there is no signaling from the UE to indicate which substate it is in, it is necessary to mirror the timer functionality described for the UE above, in the network. This is important to ensure that the RNC sends allocation messages to UEs operating in a data traffic inactive substate that are actually listening to the allocation channel in that frame. Advantageously, synchronisation is performed by running the same timer (for example using a same expiration time) at the network, and also by looking at the DL buffer occupancy and buffer occupancy reports provided by the UE and allowing the timer to run when both of these are zero.

The aforementioned functionality provides a modification of the existing PDCP functions by identifying the 'keep alive' packets and adapting MAC-layer and RRC-layer logic to control when the UE looks at the allocator channel in response thereto. For example, in older versions of 3GPP it was the RRC layer that controlled the shared channel operation. Hence, in this case, the RRC can be told that the UE needs only look at the allocator channel infrequently. In later versions of 3GPP (when enhanced Uplink and HSDPA are used), then the MAC layer is the layer that controls and receives allocation information. Hence, this control tells the appropriate entity, either the MAC logic entity or the RRC logic entity to look at the allocator channel infrequently. For example, once every 16 frames.

Figure 5:
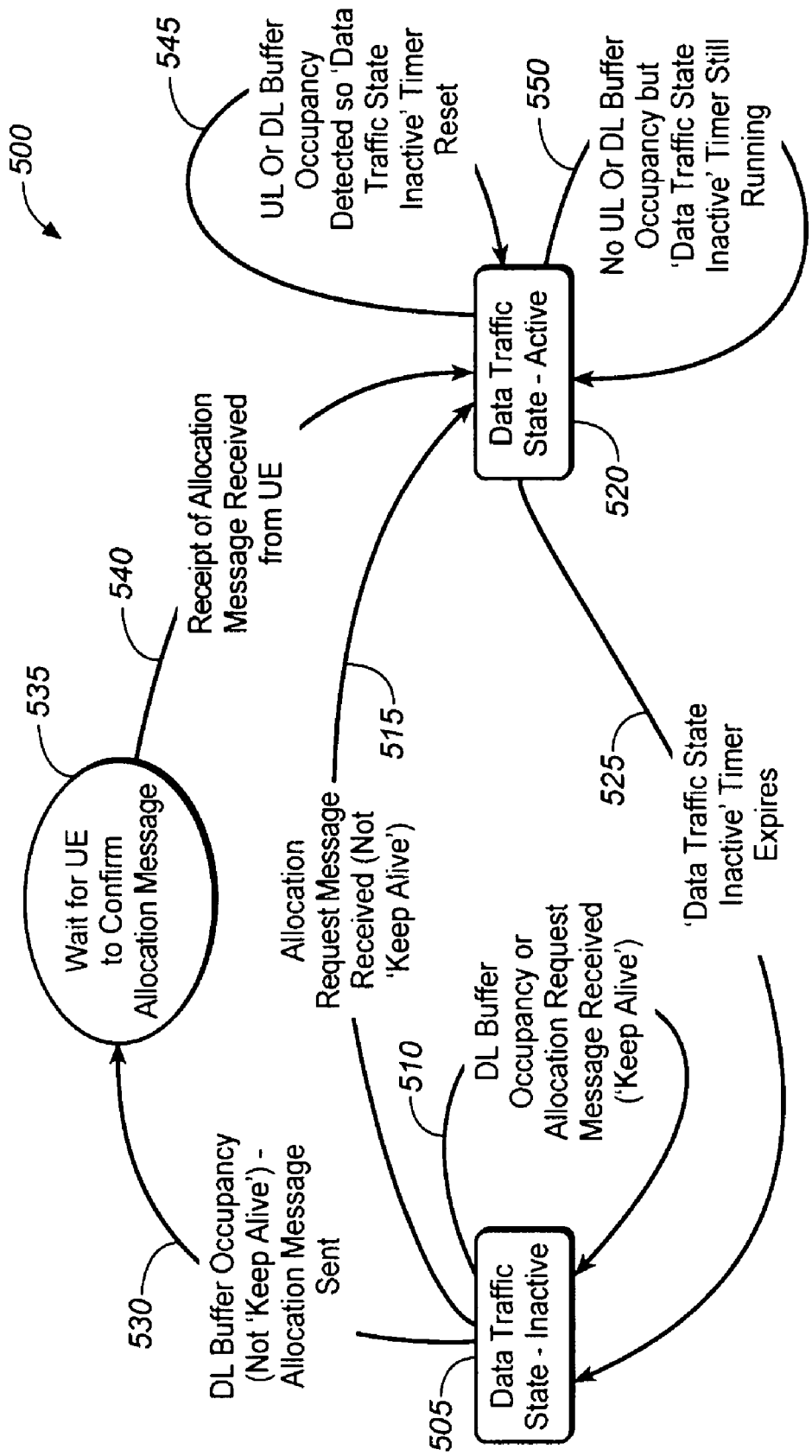
FIG. 5 illustrates a network-side state diagram in accordance with some embodiments of the invention.

Referring now to FIG. 5, a network-side state diagram 500 is illustrated in accordance with some embodiments of the invention. In some embodiments of the invention, for example, in a non-LTE implementation, the network-side state diagram 500 may be employed in the RNC, which will be used hereafter. The RNC operation commences when the RNC has zero RLC buffer occupancy in DL and UL for a particular UE. The RNC may recognize that there is no UL buffer occupancy, based on reports from the UE, rather than direct inspection of the buffers. Here, the RNC starts the 'data traffic state inactive (RNC)' timer for that UE, as shown in step 505. Whilst the UE is still in the inactive substate, the RRC logic will act upon requests for allocation messages from the UE as normal, where the allocations are made in the appropriate frame. Normal operation in the context of embodiments of the present invention is where the buffer occupancy is reported to the allocator/scheduler logic (either in the MAC layer or the RRC/RNC logic) and resources are allocated. However, if the UE is in the inactive substate, then the allocation message is sent during a frame when the UE is listening.

The RNC remains in the data traffic 'inactive' substate 505 while DL buffer occupancy or an allocation request message is received, for example thereby indicating that 'keep alive' data is detected in step 510.

If at anytime a request for allocation is received at the RNC, then this will be acted on in the normal manner and the UE will stay in the inactive substate. Only if the packet identifying logic subsequently indicates that non 'keep alive' data is present in a received allocation request message, in step 515, will the UE be declared to be in an active data traffic state as shown in step 520. Alternatively, if the packet identifying logic declares that the data is only 'keep alive' data, then the UE will stay in the inactive substate, looping as shown in step 510.

While the UE is operating in the inactive substate, then at any time where the DL RLC buffer occupancy is greater than zero, for example the DL buffer occupancy comprises 'non-keep alive' data, in step 530, and the RRC allocates resources to this UE, then the RRC logic transmits an allocation message to the UE. This allocation message will request that the UE confirm receipt of this message, as well as allocating resources to the UE. The RNC then waits for the UE to transmit a confirm allocation message in step 535. Upon receipt of the confirm allocation message received from the UE in step 540, the data traffic state becomes active in step 520.

If the RNC UL or DL buffer occupancy is detected, the 'data traffic state inactive' timer is reset, as shown in step 545. In contrast, if the RNC detects no UL or DL buffer occupancy, the 'data traffic state inactive' timer remains running, as shown in step 550.

If the data traffic state inactive timer expires, in step 525, then the UE will be considered to be in the data traffic inactive substate, in step 505.

Thus, the aforementioned functionality and state transition operations provides a modification of the existing PDCP functions by identifying the 'keep alive' packets and adapting MAC-layer and RRC-layer logic to allow the scheduler to know when UEs will be monitoring the allocator channel in response thereto. Here, the scheduler may be the standard 'request and allocate' scheduler in 3GPP, where buffer volumes are input and resources are allocated to the UE as output. Simple round robin schemes may be employed or more complex techniques employed, such as weighted fair queuing.

Figure 6:
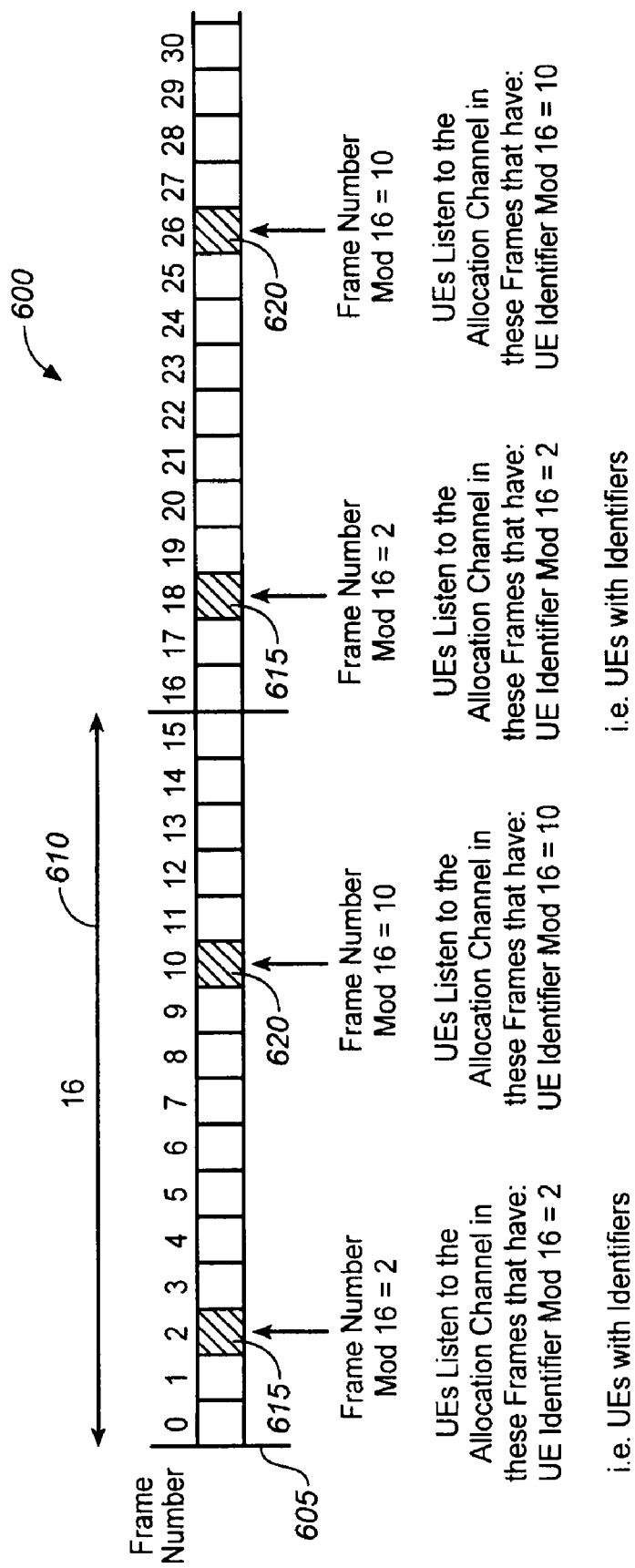
FIG. 6 illustrates a timing frame format adapted in accordance with some embodiments of the invention.

Referring now to FIG. 6, a timing frame format 600 illustrates one embodiment of how frames are determined for those UEs, which are operating in an inactive substate, for them to be able to read the allocation channel.

The allocation channel may be either expressly signalled to the UE in the initial setup message (typically in the radio bearer setup message in a 3GPP context) or via a predefined mapping based on the UEs identifier such as:

(UE_identifier mod repetition_period)=Frame_number mod repetition_period.

In both cases the frame at which the UE listens to the allocation channel is known to both the UE and network sides, as the UEs are allocated a particular frame in which they listen to the allocation channel. For example, as illustrated in FIG. 6, the UE may be instructed to listen to the allocation channel in the frames that the UE identifies, such as frame number 16='2' 615 and frame number 16='10' 620. A typical repetition_period 610 would be 16 frames or 32 frames.

Although the aforementioned embodiment is described with reference to only listening to two frames from sixteen frames, any number of infrequently read frames versus non-read frames may be used, dependent upon the desired application. For example, for applications where power saving is a key requirement, the UE may be configured to more infrequently read the allocation frames, e.g. read a single allocated frame every 32 or 64 frames. Alternatively, if minimising latency is a key driver in the chosen application, then reading alternative frames or, for example, a frame every three frames may be employed.

In some embodiments of the invention, the decision on the infrequency rate may be dynamically and autonomously adjusted by a controller (say controller 314 in FIG. 3) based on the application being performed.

Since the UE now reads the allocation channel infrequently, the network must delay any allocation of radio resources to the UE (in response to a DL buffer occupancy indication) until the network (e.g. an RNC in one embodiment of the invention) knows that the UE will read the allocation channel. Therefore, as will be appreciated by one skilled in the art, there is a slight increase in latency associated with inactive sub-state UEs. This is due to the infrequent listening to the allocator channel by the UE. The period of the listening is controlled by the signaling from the network. However, the latency here is significantly less than the known conventional approach of placing the UE in the paging state. In a paging state, the UE detects paging indicators, subsequently listens to the paging channel and extricates itself from the paging state. Then could an allocation to the UE be made. Thus, the known conventional approach of placing the UE in the paging state represents significantly more latency than is the case with the aforementioned embodiments of the invention.

In the case of UL data transmission, the UE may immediately send a request for allocation when UL buffer occupancy is detected at the UE. The UE will then immediately leave the inactive substate, thereby allowing the allocation to be made immediately. Advantageously, there is therefore no latency penalty associated with UL data transmission.

It will be appreciated that, for clarity purposes, the above description has described embodiments of the invention with reference to different functional units and processors. However, it will be apparent that any suitable distribution of functionality between different functional units or processors, for example with respect to the broadcast mode logic or management logic, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may be implemented, at least partly, as computer software running on one or more data processors and/or digital signal processors. Thus, the elements and components of an embodiment of the invention may be physically, functionally and logically implemented in any suitable way. The functionality may be implemented in a single unit, in a plurality of units or as part of other functional units.

Although embodiments of the invention are described in terms of the cell_FACH state in a 3GPP wireless communication system, the inventive concept is not restricted to these embodiments. In particular, for example, embodiments of the invention may be applied to future evolutions of UTRA 3GPP (currently referred to as 'long term evolution' (LTE)) or indeed any other 'state' based channel resource mechanism for any other wireless communication system.

The aforementioned inventive concept aims to provide at least one or more of the following advantages:
  (i) Latency associated with UL data transmission is unaffected compared to conventional data traffic state (therefore significantly better than for the case where UEs are placed in paging state).
  (ii) Latency associated with DL transmission is only marginally increased compared to conventional data traffic state (therefore significantly better than for the case where UEs are placed in paging state).
  (iii) Significant UE power saving can be achieved compared to conventional data traffic state operation.
  (iv) In this manner, a significant conservation in the battery life of the wireless subscriber communication unit can be achieved.
  (v) Power UE power saving is achieved despite the existence of 'keep alive' messages that would ordinarily move the UE to an 'active' state.

While the invention has been described in terms of particular embodiments and illustrative figures, those of ordinary skill in the art will recognize that the invention is not limited to the embodiments or figures described. Although embodiments of the present invention are described, in some instances, using UMTS terminology, those skilled in the art will recognize that such terms are also used in a generic sense herein, and that the present invention is not limited to such systems.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term 'logic' herein refers to fixed hardware, programmable logic and/or an appropriate combination thereof, as would be recognized by one skilled in the art to carry out the recited functions.) Software and, firmware can be, stored on computer-readable media. Some other processes can be implemented using analog circuitry, as is well known to one of ordinary skill in the art. Additionally, memory or other storage, as well as communication components, may be employed in embodiments of the invention.

Figure 7:
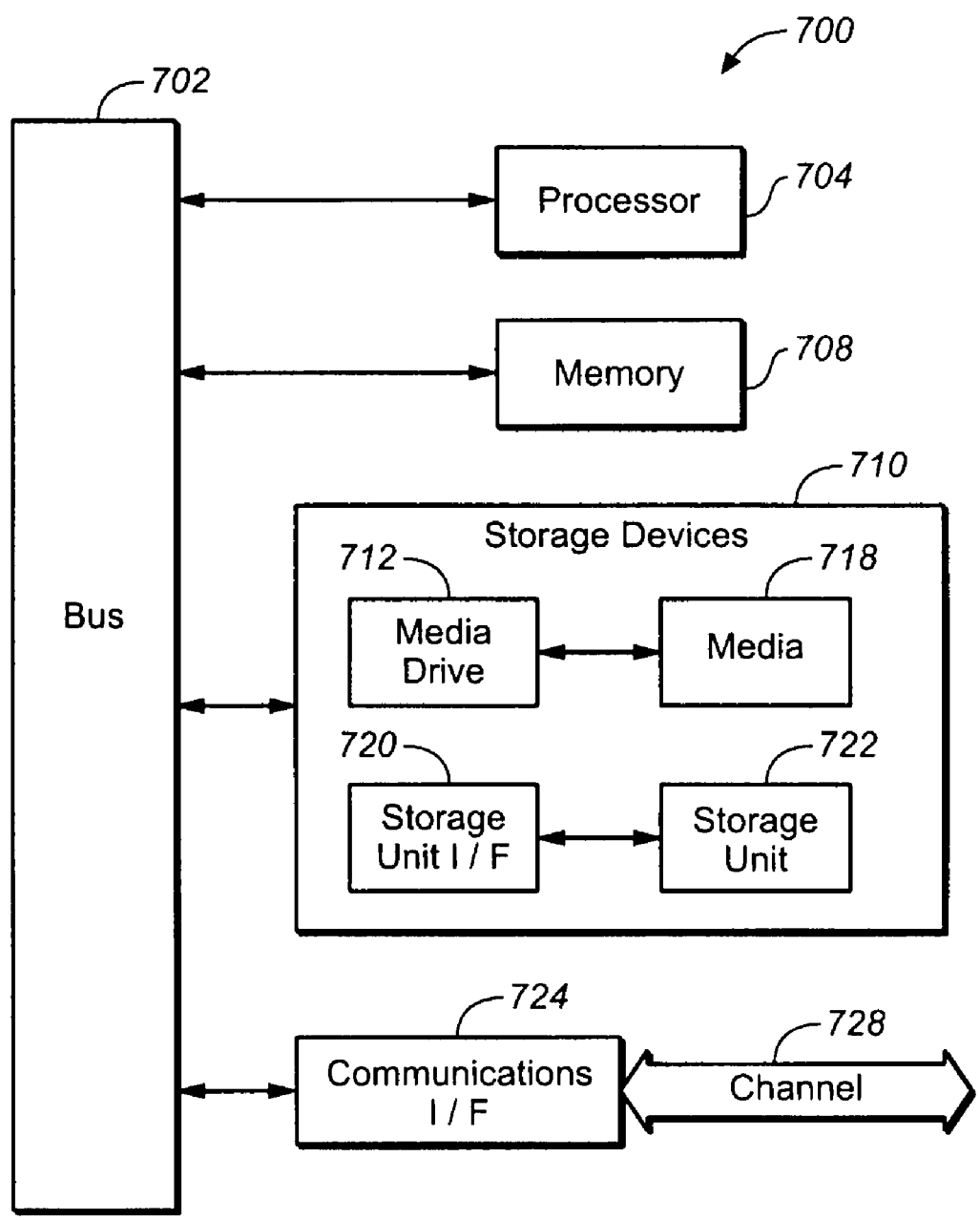
FIG. 7 illustrates a typical computing system that may be employed to implement processing functionality in embodiments of the invention.

FIG. 7 illustrates a typical computing system 700 that may be employed to implement processing functionality in embodiments of the invention. Computing systems of this type may be used in the eNB (in particular, the scheduler of the eNB), core network elements, such as the aGW, and the UEs, for example. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment.

Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In some embodiments, information storage system 710 may include other similar components for allowing computer programs or other instructions or data to be loaded into computing system 700. Such components-may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A communication unit comprising:
 a receiver that receives a message sent on an allocation channel; and
 packet identifying logic capable of identifying whether a keep alive message is contained in a received communication resource allocation message, wherein, in an active mode of operation, the receiver is capable of intermittently receiving a communication resource allocation message sent on the allocation channel and capable of transitioning to continuously receive a subsequent message sent on the allocation channel in response to the packet identifying logic determining a subsequent message other than a keep alive message,
 wherein the keep alive message is a link control protocol (LCP) echo/response message in the inactive state.

2. A communication unit, comprising:
 a receiver that receives messages sent on an allocation channel;
 buffer logic configured to buffer data packets to be sent to a second communication unit; and
 buffer determining logic operably coupled to the buffer logic and that identifies buffer occupancy in at least one uplink radio link control (RLC) buffer(s), wherein, in an active mode of operation, the receiver is capable of intermittently receiving a message sent on the allocation channel and capable of transitioning to continuously receive the message sent on the allocation channel in response to the buffer logic identifying that data packets are to be transferred to the second communication unit.

3. A communication unit, comprising:
 a receiver that receives a message sent on an allocation channel;
 buffer logic configured to buffer data packets to be sent to a second communication unit;
 buffer determining logic operably coupled to the buffer logic operable to identify for buffer occupancy in at least one of:
  at least one uplink radio link control (RLC) buffer(s); and
  at least one downlink radio link control (RLC) buffer(s), wherein, in an active mode of operation, the receiver is capable of intermittently receiving a message sent on the allocation channel and capable of transitioning to continuously receive the message sent on the allocation channel in response to the buffer logic identifying that data packets are to be transferred to the second communication unit.

4. A method of saving power in a cellular communication unit comprising:
 receiving messages sent on an allocation channel of a cellular communication system;
 identifying whether a keep alive message is contained in a received communication resource allocation message;
 intermittently receiving the messages sent on the allocation channel; and
 transitioning to continuously receive the message sent on the allocation channel in response to determining a message other than the keep alive message, wherein the keep alive message is a link control protocol (LCP) echo/response message in an inactive state.

5. A method of saving power in a cellular communication unit comprising:
 receiving messages sent on an allocation channel of a cellular communication system;
 buffering data packets to be sent to a second communication unit;
 identifying buffer occupancy in at least one uplink radio link control (RLC) buffer(s);
 intermittently receiving the messages sent on the allocation channel; and
 transitioning to continuously receive the message sent on the allocation channel in response to identifying that data packets are to be transferred to the second communication unit.

6. A method of saving power in a cellular communication unit further comprising:
 receiving messages sent on an allocation channel of a cellular communication system;
 buffering data packets to be sent to a second communication unit;
 identifying buffer occupancy in at least of:
  at least one uplink radio link control (RLC), buffer(s); and
  at least one downlink radio link control (RLC) buffer(s);
 intermittently receiving the messages sent on the allocation channel; and
 transitioning to continuously receive the message sent on the allocation channel in response to identifying that data packets are to be transferred to the second communication unit.

7. A non-transitory computer readable medium including computer program instructions, which when executed by a communication unit, cause the communication unit to perform a method comprising:
 receiving messages sent on an allocation channel of a cellular communication system;
 identifying whether a keep alive message is contained in a received communication resource allocation message;
 intermittently receiving the messages sent on the allocation channel; and
 transitioning to continuously receive the message sent on the allocation channel in response to determining a message other than the keep alive message, wherein the keep alive message is a link control protocol (LCP) echo/response message in an inactive state.

8. A non-transitory computer readable medium including computer program instructions, which when executed by a communication unit, cause the communication unit to perform a method comprising:
 receiving messages sent on an allocation channel of a cellular communication system;
 buffering data packets to be sent to a second communication unit;
 identifying buffer occupancy in at least one uplink radio link control (RLC) buffer(s);
 intermittently receiving the messages sent on the allocation channel; and
 transitioning to continuously receive the message sent on the allocation channel in response to identifying that data packets are to be transferred to the second communication unit.

9. A non-transitory computer readable medium including computer program instructions, which when executed by a communication unit, cause the communication unit to perform a method comprising:
  receiving messages sent on an allocation channel of a cellular communication system;
  buffering data packets to be sent to a second communication unit;
  identifying buffer occupancy in at least of:
    at least one uplink radio link control (RLC), buffer(s); and
    at least one downlink radio link control (RLC) buffer(s);
  intermittently receiving the messages sent on the allocation channel; and
  transitioning to continuously receive the message sent on the allocation channel in response to identifying that data packets are to be transferred to the second communication unit.

10. A communication unit comprising:
  logic for receiving messages sent on an allocation channel of a cellular communication system;
  logic for identifying whether a keep alive message is contained in a received communication resource allocation message;
  logic for intermittently receiving the messages sent on the allocation channel; and
  logic for transitioning to continuously receive the message sent on the allocation channel in response to determining a message other than the keep alive message, wherein the keep alive message is a link control protocol (LCP) echo/response message in an inactive state.

11. A communication unit comprising:
  logic for receiving messages sent on an allocation channel of a cellular communication system;
  logic for buffering data packets to be sent to a second communication unit;
  logic for identifying buffer occupancy in at least one uplink radio link control (RLC) buffer(s);
  logic for intermittently receiving the messages sent on the allocation channel; and
  logic for transitioning to continuously receive the message sent on the allocation channel in response to identifying that data packets are to be transferred to the second communication unit.

12. A communication unit comprising:
  logic for receiving messages sent on an allocation channel of a cellular communication system;
  logic for buffering data packets to be sent to a second communication unit;
  logic for identifying buffer occupancy in at least of:
    at least one uplink radio link control (RLC), buffer(s); and
    at least one downlink radio link control (RLC) buffer(s);
  logic for intermittently receiving the messages sent on the allocation channel; and
  logic for transitioning to continuously receive the message sent on the allocation channel in response to identifying that data packets are to be transferred to the second communication unit.

13. A cellular communication system supporting communication between a communication unit and a second communication unit, wherein the communication unit comprises:
  a receiver that receives a message sent on an allocation channel; and
  packet identifying logic capable of identifying whether a keep alive message is contained in a received communication resource allocation message, wherein, in an active mode of operation, the receiver is capable of intermittently receiving a communication resource allocation message sent on the allocation channel and capable of transitioning to continuously receive a subsequent message sent on the allocation channel in response to the packet identifying logic determining a subsequent message other than a keep alive message,
  wherein the keep alive message is a link control protocol (LCP) echo/response message in the inactive state.

14. A cellular communication system supporting communication between a communication unit and a second communication unit, wherein the communication unit comprises:
  a receiver that receives messages sent on an allocation channel;
  buffer logic configured to buffer data packets to be sent to the second communication unit; and
  buffer determining logic operably coupled to the buffer logic and that identifies buffer occupancy in at least one uplink radio link control (RLC) buffer(s), wherein, in an active mode of operation, the receiver is capable of intermittently receiving a message sent on the allocation channel and capable of transitioning to continuously receive the message sent on the allocation channel in response to the buffer logic identifying that data packets are to be transferred to the second communication unit.

15. A cellular communication system supporting communication between a communication unit and a second communication unit, wherein the communication unit comprises:
  a receiver that receives a message sent on an allocation channel;
  buffer logic configured to buffer data packets to be sent to the second communication unit;
  buffer determining logic operably coupled to the buffer logic operable to identify buffer occupancy in at least one of:
    at least one uplink radio link control (RLC) buffer(s); and
    at least one downlink radio link control (RLC) buffer(s),
    wherein, in an active mode of operation, the receiver is capable of intermittently receiving a message sent on the allocation channel and capable of transitioning to continuously receive the message sent on the allocation channel in response to the buffer logic identifying that data packets are to be transferred to the second communication unit.

* * * * *